Jan. 20, 1970   Z. BRIERLEY   3,490,884
METHOD OF AND MACHINE FOR GRINDING TWIST DRILL POINTS
Filed March 14, 1966   2 Sheets-Sheet 1
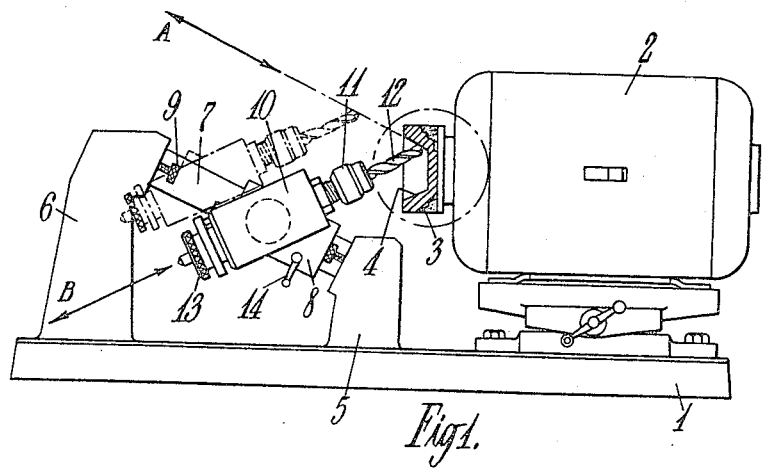
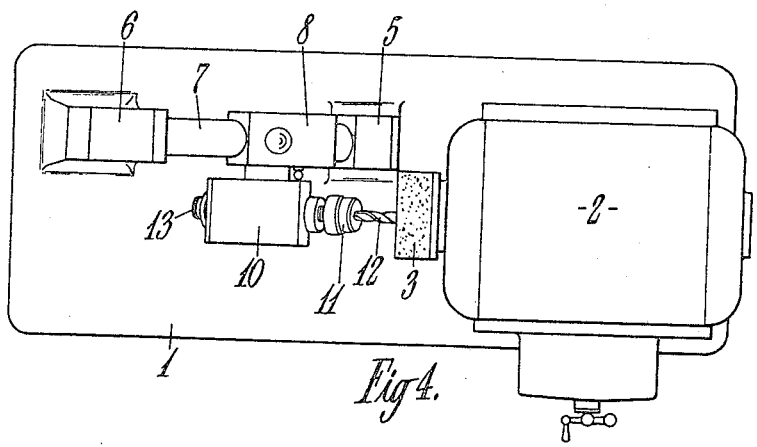
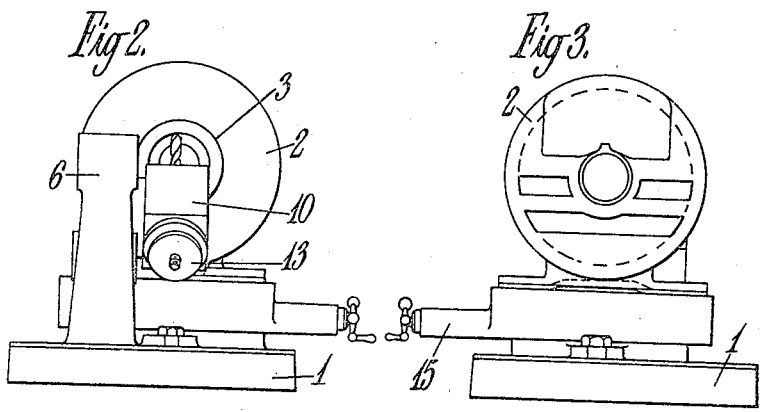
INVENTOR
ZACHRY BRIERLEY
BY Emory L. Groff Jr. Atty

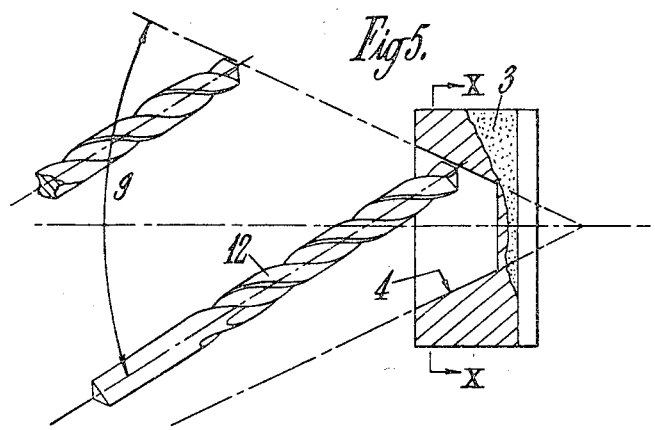
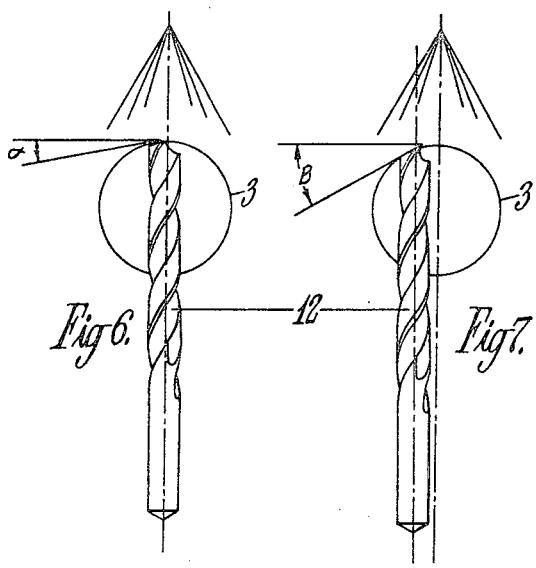
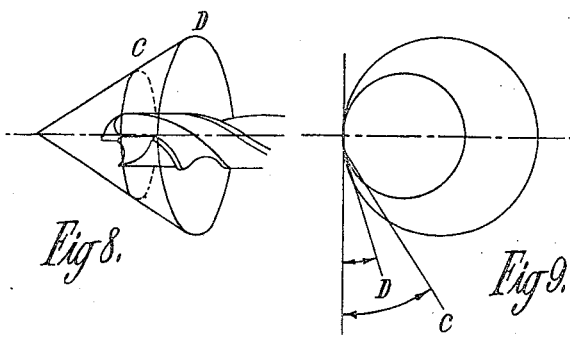

United States Patent Office 3,490,884
Patented Jan. 20, 1970

3,490,884
METHOD OF AND MACHINE FOR GRINDING TWIST DRILL POINTS
Zachry Brierley, Woodlands, Queens Road, Llandudno, Wales
Filed Mar. 14, 1966, Ser. No. 534,243
Claims priority, application Great Britain, Mar. 17, 1966, 11,295/65
Int. Cl. B24b 7/00, 9/00, 19/16
U.S. Cl. 51—73                                   1 Claim

ABSTRACT OF THE DISCLOSURE

A machine for grinding twist drill points which includes a motor driven grinding wheel mounted on a base and having a cup-shaped tapered recess in one face thereof. The motor and grinding wheel are displaceable laterally of the base and displaceable means for supporting a drill to be ground is provided, which means is adapted to move a cutting lip of the drill towards and away from the circumferential wall of the recess of the grinding wheel in parallelism with the angle of the tapered face of the recess of the wheel which is contacted by the drill point.

---

This invention concerns a method of and a machine for grinding twist drill points, and has for its primary objects the provision of a method of and a machine for grinding twist drill points which enables drills to be ground, if desired by unskilled labour, in an extremely accurate, expeditious and simple manner using a machine which can be produced at low cost in comparison with the very intricate and costly machinery at present provided for this purpose.

According to this invention there is provided a machine for grinding the points of twist drills which comprises a power-driven cup-shaped grinding wheel having the circumferential wall of the recess of conical or frusto-conical shape, and displaceable means for supporting a drill to be ground which is adapted to move a cutting lip of the drill towards and away from the circumferential wall of the recess of the wheel in parallelism with the angle of the conical grinding face of the recess of the wheel contacted by the drill point. Means is also preferably provided for withdrawing and advancing the drill axially towards and away from said grinding surface to facilitate turning of the drill to bring the other or another cutting lip of the drill point into a grinding position.

According to a preferred form of the invention, means is also provided for effecting indexing of the drill to bring the other or another cutting lip thereof accurately into a grinding position.

It is preferred to arrange that the indexing of the drill is performed automatically by actuating unclamping, turning and reclamping means for the drill which is incorporated in a drill holder.

Alternatively, indexing of the drill may be achieved merely by unclamping, turning and reclamping the drill manually.

The invention also provides a method of grinding the cutting lips of drill points using a machine as set forth above, the method broadly consisting in engaging a drill point with the internal circumferential face of a cup-shaped grinding wheel having a conical or frustoconical recess in one face, and positioning the drill so that a cutting lip thereof extends in parallelism with the angle of the conical grinding face of the recess of the grinding wheel at its point of contact.

To enable the invention to be clearly understood, a preferred embodiment thereof will now be described by way of example with reference to the accompanying drawings, wherein:

FIGURE 1 is a side elevation of the machine.
FIGURES 2 and 3 are end elevations.
FIGURE 4 is a plan view.
FIGURE 5 is a detail view drawn to a larger scale illustrating the position of a drill relatively to the conical internal grinding surface of the grinding wheel.
FIGURES 6 and 7 are diagrammatic views taken on the line X—X of FIGURE 5, and showing how the clearance angle behind the drill lips can be varied, and
FIGURES 8 and 9 are diagrammatic views showing features of the method of grinding.

Referring firstly to FIGURES 1 to 4 of the said drawings, the machine comprises a base 1 on which is mounted an electric motor 2 on the shaft of which is mounted a cup-shaped grinding wheel 3 the recess 4 of which is of frustoconical or conical shape, the angle of taper of which is predetermined or can be altered to suit requirements either by changing the wheel for one of a desired angle or by appropriately dressing the wheel.

The base 1 is provided with a pair of spaced apart upstanding supports 5 and 6 which support a slideway 7 which can be of any conventional form, that shown being a roundway and which is positioned so as to be parallel to the inclination of the recess 4 of the grinding wheel at the top dead centre of the latter measured in the same vertical plane. The support 6 is not essential and can be omitted if required.

To enable the inclination of the slideway 7 to be varied so that it can be adjusted so as to remain parallel to the tapering surface of a wheel having a different internal cone angle, the slideway 7 can be pivotally mounted so that it can be set and its inclination adjusted to suit requirements.

A block 8 is slidably mounted on the slideway 7 so as to be movable in opposite directions as indicated by the double-headed arrow A, and means such as adjustable stops 9 are provided to limit the length of sliding movement of the block 8.

Attached to the block 8 is a second block 10 provided with a spindle and chuck 11 for holding a drill 12 to be ground. This second block 10 is mounted to swivel relatively to the block 8 to enable the axis of a drill to be changed so that the drill point can be ground at a different included angle, i.e. the angle gamma indicated in FIGURE 5.

A suitable index plate 13 is mounted at the rear end of the drill holding spindle, so that after one lip of the drill point has been ground it can be turned about its axis to bring the second or subsequent lip into contact with the grinding wheel 3. A locking mechanism 14 is also provided to lock the block 8 in any position along the slideway 7.

The electric motor 2 is supported on a slideway 15 so that it can be moved sideways together with the cup-shaped grinding wheel, thereby causing the drill point to take up an offset position relative to a vertical axis passing through the centre of the grinding wheel 3. This adjustment is shown in FIGURES 6 and 7. The result of this movement can be seen in the change in angle "alpha" in FIGURE 6 to angle "beta" in FIGURE 7, resulting in a change in the clearance angle produced behind the drill lips. A simple screw feed mechanism is incorporated so as to move the drill point towards or away from the wheel 3 in the direction of the double-headed arrow B (FIGURE 1).

Referring next to FIGURES 8 and 9, it will be seen that because the centre of the drill passes deeper into the wheel cone 3 than the outer portion of the drill lip, the centre of the drill is ground by that part of the wheel shown by the segment marked C, which is of a smaller diameter than that marked D. It is therefore a feature of the method of grinding provided by this invention, that the clearance angle immediately behind the drill point, is greater than that resulting behind the outer portion of the drill lip. Furthermore, this increased clearance angle is progressive from outer edge to inner edge of the drill lip. This situation is desirable, since when the drill is in use the centre travels more slowly than the outer edge and thereby requires a greater clearance if the penetration of the drill into the material is not to be impeded.

It is to be appreciated that the embodiment described above is given by way of example only, and that modifications can be made within the scope of the invention. For instance, although the slideway 7 is shown as a roundway, it may assume different forms, for example two or more roundways may be employed, or alternatively, V guides or the equivalent. Also, although the drill holding device is shown as being of the collet type chuck, it could be a three, four or six jaw chuck or could comprise a series of bush guides or a V block.

Although reference has been made to the grinding wheel 3 being mounted on the end of the motor shaft, this wheel may be mounted separately from the motor and driven through the medium of belting or gearing. This arrangement permits a suitable control of the speed of the wheel to be obtained.

If desired, a suitable optical system for viewing the point of the drill prior to or after a grinding operation may be provided.

It is to be appreciated that the entire machine, when in use, may be made to assume any desired position, i.e. its position shown in FIGURE 1 instead of being a side elevation could, when the machine is in use, be a plan or an inverted plan view, and in such cases the base 1 would be repositioned accordingly.

I claim:

1. A machine for grinding the points of twist drills comprising in combination, a base, a motor mounted on said base, support means for said motor, said motor including a drive shaft, a grinding wheel mounted on said drive shaft, said grinding wheel including a recess having a tapered side wall in one face thereof, upstanding support means on said base, a slideway mounted in said support means, said slideway disposed in a position parallel to the inclination of the tapered side wall of said recess of the grinding wheel at the top dead center thereof measured in the same vertical plane, displaceable means mounted on said slideway for supporting a drill to be ground, said means including a first block member slideable on said slideway, a second block member secured to said first block member and offset therefrom, said second block member including a chuck for holding a drill to be ground, means for locking said first block in a desired position along said slideway, said support means for the motor permitting lateral displacement of said motor and the grinding whheel relative to the base to thereby cause the drill point to take up an offset position relative to a plane passing through the axis of the wheel to effect a change in the clearance angle produced behind the drill lips.

References Cited

UNITED STATES PATENTS

| 1,994,975 | 3/1935 | Williams. | |
| 2,017,532 | 10/1935 | Elter | 51—120 X |
| 2,109,600 | 3/1938 | Vanderbeek | 51—73 |
| 2,342,889 | 2/1944 | Polson. | |
| 2,363,482 | 11/1944 | Clarke. | |
| 3,100,956 | 8/1963 | Niquet | 51—219 |

ROBERT C. RIORDON, Primary Examiner

D. G. KELLY, Assistant Examiner

U.S. Cl. X.R.

51—219